United States Patent [19]

Rozman et al.

[11] Patent Number: 5,495,163
[45] Date of Patent: Feb. 27, 1996

[54] CONTROL FOR A BRUSHLESS GENERATOR OPERABLE IN GENERATING AND STARTING MODES

[75] Inventors: Gregory I. Rozman, Rockford; Ablert L. Markunas, Roscoe; Michael J. Hanson, Loves Park, all of Ill.

[73] Assignee: Sundstrand Corporation, Rockford, Ill.

[21] Appl. No.: 61,496

[22] Filed: May 12, 1993

[51] Int. Cl.⁶ .................................................. F02N 11/04
[52] U.S. Cl. .................................. 322/10; 322/46; 322/36
[58] Field of Search .............................. 322/10; 290/31, 290/46; 310/156; 318/254

[56] References Cited

U.S. PATENT DOCUMENTS

| | | | |
|---|---|---|---|
| 3,775,974 | 12/1973 | Silver | 60/39.34 |
| 3,858,109 | 12/1974 | Liden | 322/31 |
| 3,902,073 | 8/1975 | Lafuze | 290/46 |
| 3,908,161 | 9/1975 | Messenger | 322/29 |
| 4,093,869 | 6/1978 | Hoffman et al. | 290/31 |
| 4,295,085 | 10/1981 | Lafuze | 318/721 |
| 4,354,126 | 10/1982 | Yates | 310/156 |
| 4,456,830 | 6/1984 | Cronin | 290/27 |
| 4,473,752 | 9/1984 | Cronin | 290/38 R |
| 4,684,081 | 8/1987 | Cronin | 244/58 |
| 4,687,961 | 8/1987 | Horber | 310/186 |
| 4,694,210 | 9/1987 | Elliott et al. | 310/68 R |
| 4,708,030 | 11/1987 | Cordner | 74/686 |
| 4,743,777 | 5/1988 | Shilling et al. | 290/46 |
| 4,772,802 | 9/1988 | Glennon et al. | 290/31 |
| 4,808,903 | 2/1989 | Matsui et al. | 318/800 |
| 4,841,216 | 6/1989 | Okada et al. | 322/10 |
| 4,868,406 | 9/1989 | Glennon et al. | 290/4 R |
| 4,900,231 | 2/1990 | Kennedy | 417/16 |
| 4,933,623 | 6/1990 | Fox | 322/25 |
| 4,935,686 | 6/1990 | Stacey | 318/801 |
| 4,939,441 | 7/1990 | Dhyanchand | 318/718 |
| 4,942,493 | 7/1990 | Rozman et al. | 361/23 |
| 4,947,100 | 8/1990 | Dhyanchand et al. | 322/10 |
| 4,949,021 | 8/1990 | Rozman et al. | 318/254 |
| 4,959,595 | 9/1990 | Nishimura | 318/138 |
| 4,967,334 | 10/1990 | Cook et al. | 363/34 |
| 4,968,926 | 11/1990 | Dhyanchand | 322/10 |
| 4,988,939 | 1/1991 | Reichard et al. | 318/800 |
| 4,992,721 | 2/1991 | Latos | 322/10 |
| 5,008,801 | 4/1991 | Glennon | 363/132 |
| 5,012,177 | 4/1991 | Dhyanchand et al. | 322/10 |
| 5,013,929 | 5/1991 | Dhyanchand | 290/31 |
| 5,015,927 | 5/1991 | Reichard | 318/139 |
| 5,015,941 | 5/1991 | Dhyanchand | 322/10 |
| 5,028,803 | 7/1991 | Reynolds | 290/31 |
| 5,040,366 | 8/1991 | Schulze | 60/39.08 |
| 5,051,670 | 9/1991 | De Piola | 318/434 |

(List continued on next page.)

FOREIGN PATENT DOCUMENTS 2206751  1/1989  United Kingdom.

OTHER PUBLICATIONS

E. Iizuka, et al., *IEEE Transactions on Industry Applications*, vol. 1A–21, No. 4, May/Jun. 1985.
Furuhashi, et al., *IEEE Transactions on Industrial Electronics*, vol. 39, No. 2, Apr. 1992.
A. E. Fitzgerald, et al., *Electric Machinery*, 246–249, 270–271.

*Primary Examiner*—Thomas M. Dougherty
*Assistant Examiner*—Nicholas Ponomarenko
*Attorney, Agent, or Firm*—Marshall, O'Toole, Gerstein, Murray & Bicknell

[57] ABSTRACT

A detector for detecting rotor position of a brushless generator having a motive power shaft, a permanent magnet generator (PMG) having a set of armature phase windings and a main generator portion having a set of armature phase windings includes a circuit coupled to the armature phase windings of the PMG for deriving a number of interval pulses per revolution of the motive power shaft. A circuit measures time periods between adjacent interval pulses and the measured time periods are converted into an indication of the angular position of the motive power shaft in accordance with a parameter of power delivered to one of the main generator portion armature phase windings.

31 Claims, 8 Drawing Sheets

U.S. PATENT DOCUMENTS

| | | | |
|---|---|---|---|
| 5,055,700 | 10/1991 | Dhyanchand | 290/31 |
| 5,055,764 | 10/1991 | Rozman et al. | 322/10 |
| 5,068,590 | 11/1991 | Glennon et al. | 322/10 |
| 5,079,494 | 1/1992 | Reichard | 318/811 |
| 5,097,195 | 3/1992 | Raad et al. | 322/10 |
| 5,113,125 | 5/1992 | Stacey | 318/721 |
| 5,132,604 | 7/1992 | Shimane et al. | 322/10 |
| 5,140,245 | 8/1992 | Stacey | 318/723 |
| 5,202,613 | 4/1993 | Kruse | 318/254 |
| 5,221,881 | 6/1993 | Cameron | 318/254 |
| 5,349,257 | 9/1994 | Hernden | 310/68 B |
| 5,384,527 | 11/1995 | Rozman et al. | 322/10 |

CONTROL FOR A BRUSHLESS GENERATOR OPERABLE IN GENERATING AND STARTING MODES

TECHNICAL FIELD

The present invention relates generally to electromagnetic machines, and more particularly to a detector for detecting the rotor position of a brushless generator and a control system incorporating such a detector.

BACKGROUND ART

An auxiliary power unit (APU) system is often provided on an aircraft and is operable to provide auxiliary and/or emergency power to one or more aircraft loads. In conventional APU systems, a dedicated starter motor is operated during a starting sequence to bring a gas turbine engine up to self-sustaining speed, following which the engine is accelerated to operating speed. Once this condition is reached, a brushless, synchronous generator is coupled to and driven by the gas turbine engine during operation in a starting mode whereupon the generator develops electrical power.

As is known, an electromagnetic machine may be operated as a motor to convert electrical power into motive power. Thus, in those applications where a source of motive power is required for engine starting, such as in an APU system, it is possible to dispense with the need for the dedicated starter motor and operate the generator as a motor during the starting sequence to accelerate the engine to self-sustaining speed. This capability is particularly advantageous in aircraft applications where size and weight must be held to a minimum.

The use of a generator in starting and generating modes in an aircraft application has been realized in a variable-speed, constant-frequency (VSCF) power generating system. In such a system a brushless, three-phase synchronous generator operates in the generating mode to convert variable-speed motive power supplied by a prime mover into variable-frequency AC power. The variable-frequency power is rectified and provided over a DC link to a controllable static inverter. The inverter is operated to produce constant-frequency AC power, which is then supplied over a load bus to one or more loads.

The generator of such a VSCF system is operated as a motor in the starting mode to convert electrical power supplied by an external AC power source into motive power which is provided to the prime mover to bring it up to self-sustaining speed. In the case of a brushless, synchronous generator including a permanent magnet generator (PMG), an exciter portion and a main generator portion mounted on a common shaft, it has been known to provide power at a controlled voltage and frequency to the armature windings of the main generator portion and to provide field current to the main generator portion field windings via the exciter portion so that the motive power may be developed. This has been accomplished in the past, for example, using two separate inverters, one to provide power to the main generator portion armature windings and the other to provide power to the exciter portion. Thereafter, operation in the generating mode may commence whereupon DC power is provided to the exciter field winding.

In order to properly accelerate the generator and prime mover during operation in the starting mode, it is necessary to properly commutate or switch the currents among the armature windings of the generator. In the past, proper commutation was achieved using an absolute position sensor, such as a resolver, a synchro, an optical encoder or hall effect devices. For example, in Lafuze, U.S. Pat. No. 3,902,073 three Hall sensors are mounted in an air gap of a PMG 120 electrical degrees apart with respect to permanent magnet rotor pole pairs. As the rotor of the PMG rotates, the voltage output of each Hall sensor switches on and off as a function of the rotor position thereby generating three square wave voltages spaced apart by 120 electrical degrees. The outputs from the Hall sensors are representative of the position of the PMG rotor. The output signals from the Hall sensors are used to control switching elements in cycloconverters to switch current to armature windings of a main generator portion.

Use of an external absolute position sensor entails considerable expense in the position sensor itself and associated electronics, and further results in extra wires and the need for an extra assembly step to install the components. Also, operational parameters often limit the accuracy of the sensor.

In view of the foregoing difficulties, other approaches have been taken in an effort to detect rotor position without the need for absolute position sensors. In the case of a brushless DC motor control, a back EMF approach has been used to detect rotor position. The back EMF of the motor is defined by the following equation:

$$E_{emf} = K\omega \sin \alpha$$

where K is a constant, $\omega$ is the angular speed of the motor and $\alpha$ is the electrical phase angle of the rotor. From the foregoing equation, it can be seen that if back EMF can be detected, rotor electrical phase angle can be determined and thus proper commutation of the armature windings of the motor can be achieved. The back EMF voltage can be detected using either of two methods, referred to as the direct method and the indirect method.

The direct method can be used to directly measure phase back EMF voltage only when the phase winding is not energized by the inverter connected thereto and when the winding is not short circuited either by closed switches in the inverter or by conducting flyback diodes in the inverter. Such conditions can be realized when a 120 degree commutation algorithm is utilized. In this case, a voltage reading is taken after a short delay following switching of the phase winding off to ensure complete current decay by the freewilling diodes. This direct technique is described in a paper entitled "Microcomputer Control for Sensorless Brushless Motor" by E. Iizuka et al., *IEEE Transactions on Industry Application*, Vol. IA-21, No. 4, May/June 1985.

The indirect method is based on estimating the back EMF from the motive terminal voltage and phase currents. This method is suitable for both 120 and 180 degree commutation algorithms. One technique that uses this method is described in a paper entitled "Position—and—Velocity Sensorless Control for Brushless DC Motor Using an Adaptive Sliding Mode Observer" by Furuhashi et al., *IEEE Transactions on Industrial Electronics*, Vol. 39, No. 2, April 1992.

Because the back EMF voltage of a motor is zero at standstill and the signal to noise ratio is small at lower speeds, the reliable determination of rotor position by detecting back EMF is limited at low rotor speeds.

A method of using a permanent magnet generator as a position sensor for motor/generator start is described in Stacey U.S. Pat. No. 5,140,245. A standard brushless generator is equipped with a PMG which is used as an emergency electric power source and as a source of control power during a normal or generating mode of operation. The PMG develops a multi-phase output which is supplied to a high resolution phase-locked loop having a binary counter which develops an output signal representing shaft position. This method, however, is limited to the situation where the number of PMG rotor poles is equal to or less than the number of poles on the main generator portion rotor so that ambiguous position readings are avoided.

SUMMARY OF THE INVENTION

In accordance with the present invention, a detector for detecting rotor position of brushless generator utilizes inexpensive components and operates in a simple and effective manner.

More particularly, a detector for detecting rotor position of a brushless generator having a motive power shaft, a permanent magnet generator (PMG) having a set of armature phase windings at which a set of PMG phase outputs are produced and a main generator portion having a set of armature phase windings capable of receiving AC power includes means coupled to the PMG armature phase windings for deriving a number of interval pulses per revolution of the motive power shaft from the PMG phase outputs. Means are coupled to the deriving means for measuring time periods between adjacent interval pulses and means are coupled to the measuring means and capable of responding to a parameter of the AC power delivered to one of the main generator portion armature phase windings for converting the measured time periods into an indication of the angular position of the motive power shaft.

Preferably, the measuring means comprises a counter which accumulates clock pulses during time periods between adjacent interval pulses. Also preferably, the counter is periodically reset a certain number of times during each revolution of the motive power shaft by the interval pulses.

Still further in accordance with the preferred embodiment, the converting means includes means for inverting a counter output signal developed by the counter to obtain an indication of the speed of the motive power shaft. The converting means also preferably includes an integrator coupled to the inverting means which develops the angular position indication. The integrator is preferably reset once per revolution of the motive power shaft by a reset signal derived from the parameter of AC power.

In accordance with a further aspect of the present invention, a starting system control for operating a brushless generator in a starting mode to convert electrical power into motive power wherein the brushless generator includes a motive power shaft, a PMG having a set of armature phase windings at which a set PMG phase outputs are produced and a main generator portion having a set of armature phase windings which receive AC power during operation in the starting mode includes means coupled to the PMG armature phase windings for deriving a number of interval pulses per revolution of the motive power shaft from the PMG phase outputs. Means are coupled to the deriving means for measuring time periods between adjacent interval pulses and means are coupled to the measuring means and responsive to a parameter of the AC power applied to one of the main generator portion armature phase windings for converting the measured time periods into indications of the speed and angular position of the motive power shaft. Preferably, means are coupled to the converting means for delivering the AC power to the set of main generator portion armature phase windings in dependence upon the speed and angular position indications.

In accordance with yet another aspect of the present invention, a method of detecting rotor position of a brushless generator having a motive power shaft, a PMG having a set of armature phase windings at which a set of PMG phase outputs are produced and a main generator portion coupled to the exciter portion includes the steps of deriving a number of interval pulses per revolution of the motive power shaft from the PMG phase outputs and measuring time periods between adjacent pulses. The measured time periods are converted into an indication of the angular position of the motive power shaft in accordance with a reset signal which is derived from a parameter of AC power on one of the main generator portion armature phase windings.

The detector of the present invention does not require the use of an absolute position sensor, nor is it limited to use with any particular commutation algorithm nor is there any constraint on the number of PMG rotor poles relative to the number of main generator portion rotor poles.

DESCRIPTION OF THE PREFERRED EMBODIMENT

Figure 1A:
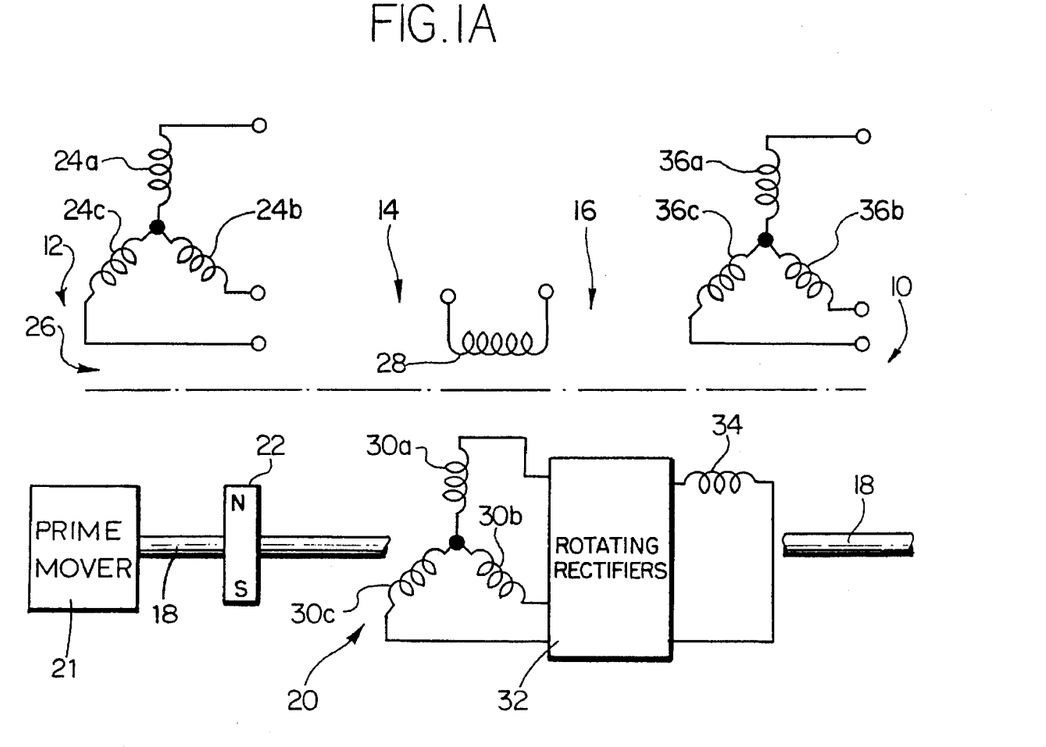
FIG. 1A comprises a combined block and schematic diagram of a brushless, synchronous generator.

Referring now to FIG. 1A, a brushless, synchronous generator 10 includes a permanent magnet generator (PMG) 12, an exciter portion 14 and a main generator portion 16. The generator 10 further includes a motive power shaft 18 interconnecting a rotor 20 of the generator 10 and a prime mover 21, such as a gas turbine engine. In a specific application of the present invention, the generator 10 and the prime mover 21 together may comprise an aircraft auxiliary power unit (APU) 22, although the present invention is equally useful in other prime mover/generator applications.

The rotor 20 carries one or more permanent magnets 23 which form poles for the PMG 12. Rotation of the motive power shaft 18 causes relative movement between the magnetic flux produced by the permanent magnet 23 and a set of three-phase PMG armature windings including phase windings 24a–24c mounted within a stator 26 of the generator 10.

The exciter portion 14 includes a field winding 28 disposed in the stator 26 and a set of three-phase armature windings 30a–30c disposed on the rotor 20. A set of rotating rectifiers 32 interconnect the exciter armature windings 30a–30c and a main generator portion field winding 34 also disposed on the rotor 20. Three-phase main generator portion armature windings 36a–36c are disposed in the stator 26.

Figure 1B:
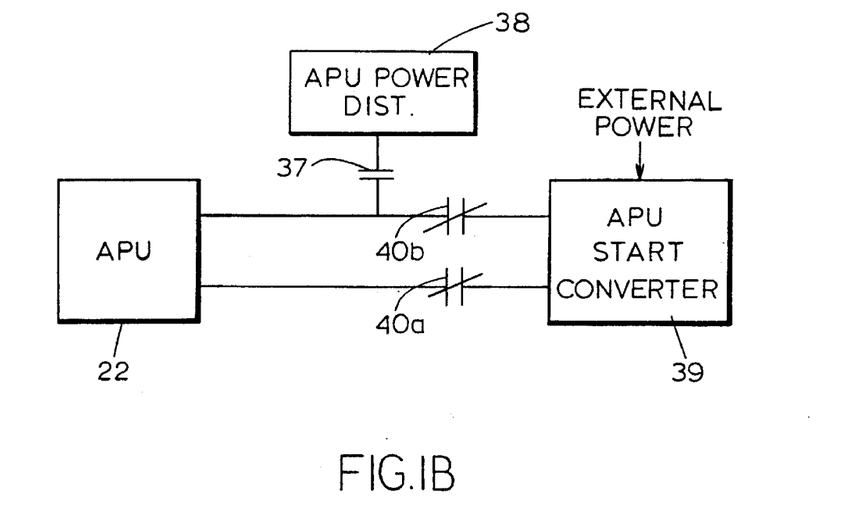
FIG. 1B comprises a block diagram of an APU system together with a start converter.

During operation in a generating mode, at least one, and preferably all three of the PMG armature windings 24a–24c are coupled through a rectifier and voltage regulator (not shown) to the exciter portion field winding 28. As the motive power shaft 18 is rotated, power produced in the PMG armature windings 24a–24c is rectified, regulated and delivered to the field winding 28. AC power is produced in the armature windings 30a–30c, rectified by the rotating rectifiers 32 and applied to the main generator portion field winding 34. Rotation of the motive power shaft 18 and the field winding 34 induces three-phase AC voltages in the main generator portion armature windings 36a–36c as is conventional. As seen in FIG. 1B, the AC voltages are supplied through a contactor set 37 to an APU power distribution network 38 and thence to one or more loads (not shown).

Often, it is desirable to use the brushless generator 10 as a motor to bring a prime mover 21 up to self-sustaining speed. This operation is accomplished by providing electrical power to the main generator portion field winding 34 via the exciter 14, providing AC power to the main generator portion armature windings 36a–36c and suitably commutating the currents flowing in the windings 36a–36c to cause the motive power shaft 18 to rotate. In a specific embodiment, the electrical power for the generator 10 is developed by an APU start converter 39, FIG. 1B, which receives external electrical power and which is connected by contactor sets 40a, 40b to the exciter field winding 28 and the armature windings 36a–36c, respectively.

Figure 2:
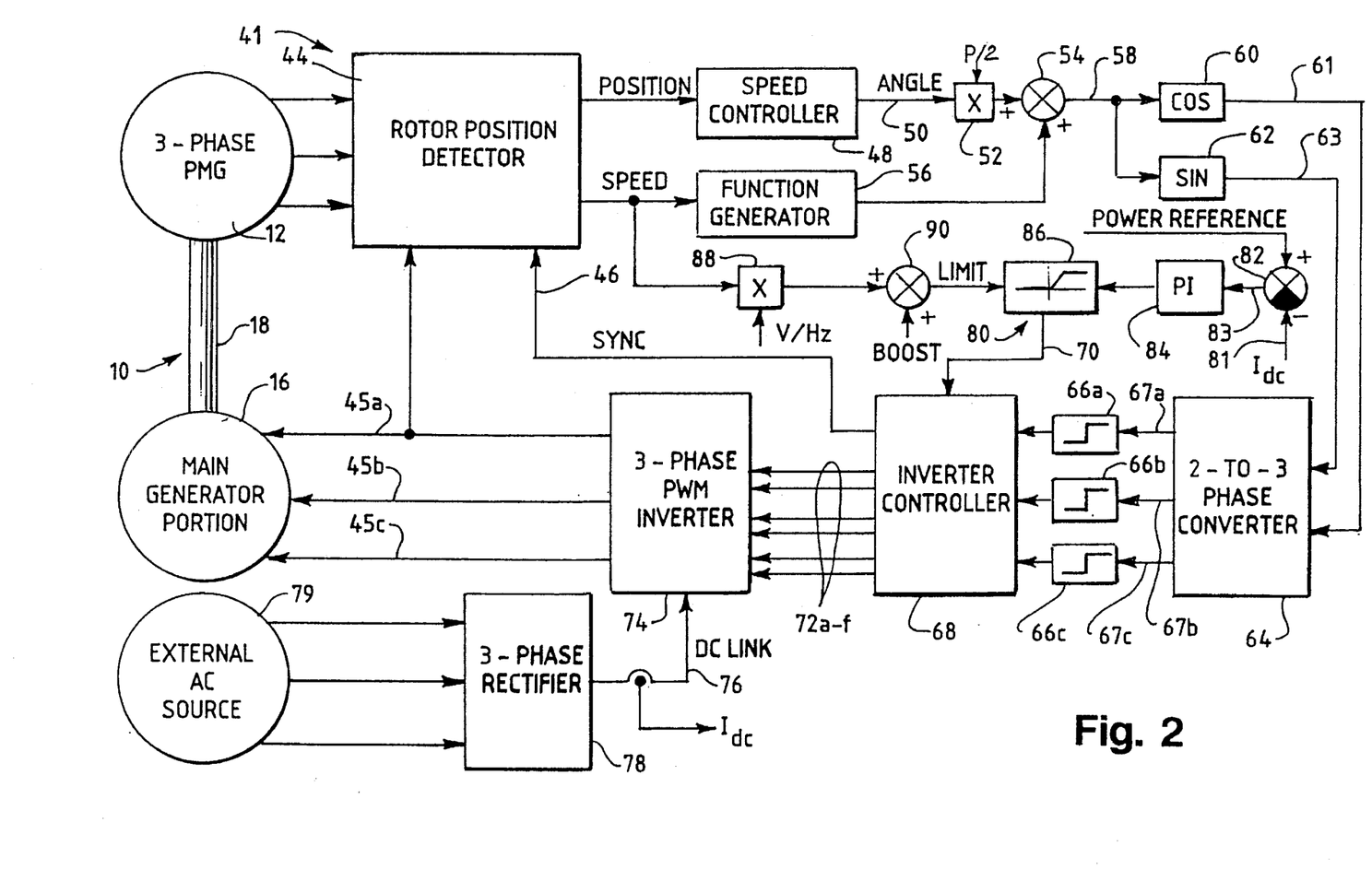
FIG. 2 comprises a block diagram illustrating a rotor position detector and a starting system control according to the present invention.

FIG. 2 illustrates the PMG 12, the main generator portion 16 and the motive power shaft 18 of the generator 10 together with a starting system control 41 for providing electrical power to the armature windings 36a–36c during operation of the generator 10 in the starting mode to convert electrical power into motive power. While not shown, power may also be provided to the exciter field winding 28, and thus to the exciter armature windings 30a–30c and thus to the main generator portion field windings 34 by any suitable means during operation in the starting mode. The application of power to the exciter field winding 28 forms no part of the present invention and will not be described in detail herein.

The starting system control 41 includes a rotor position detector 44 which is responsive to the phase outputs developed by the PMG 12, a voltage developed on one of a series of lines 45a–45c coupled to the main generator portion armature windings 36a–36c and a synchronization signal developed on a line 46 by the starting system control 41 as described in detail below. The rotor position detector 44 develops signals representing the position and speed of the motive power shaft 18 and delivers the position signal to a speed controller 48. The speed controller 48 develops a signal on a line 50 representing the mechanical position of the motive power shaft 18. The signal on the line 50 is multiplied by a multiplier 52 with a signal representing the number of pairs of poles of the main generator, and the resulting signal is summed with a phase advance signal by a summer 54. The phase advance signal is developed by a function generator 56 and is dependent upon the speed of the motive power shaft as detected by the rotor position detector 44. The function generator 56 provides increasing phase advance as speed increases in a high speed range. The summer 54 develops an electrical angle command signal on a line 58 which is supplied to first and second functional blocks 60, 62 which generate cosine and sine waveform signals, respectively, each of which has the same frequency as the electrical angle command signal on the line 58.

Figure 3:
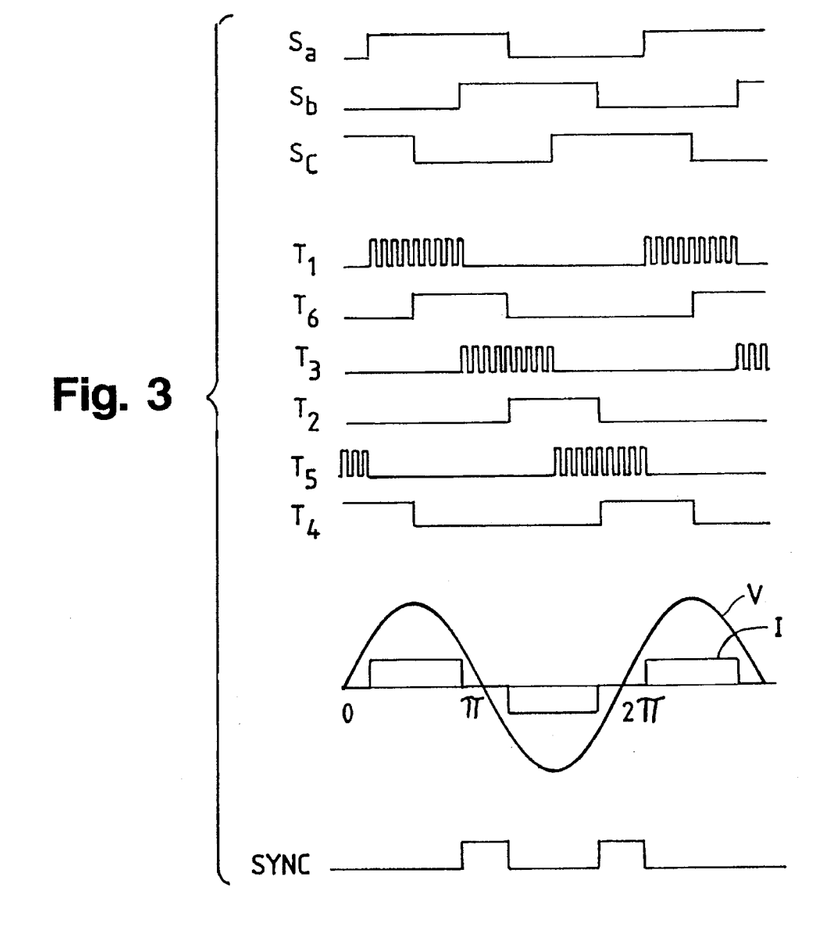
FIG. 3 illustrates the inputs to and the outputs from the controller of FIG. 2.

The sine signal and the cosine signal are supplied via a pair of lines 61, 63 to a 2-to-3 phase converter 64 which converts these signals into three-phase signals which are in turn supplied to three zero crossing detectors 66a–66c. Each of the zero crossing detectors 66a–66c detects the zero crossings of one of the three-phase signals produced by the phase converter 64 to produce square-wave signals $S_a$, $S_b$, and $S_c$, respectively, which are shown in FIG. 3 and which are separated in phase by 120°. An inverter controller 68 responds to the signals $S_a$, $S_b$, and $S_c$ and to a power control signal delivered on a line 70 to produce on lines 72a–72f pulse-width modulated (PWM) inverter control waveforms $T_1$, $T_2$, $T_5$ and commutation signals $T_2$, $T_4$, $T_6$ which are shown in FIG. 3. If desired, the signals $T_2$, $T_4$, $T_6$ may also be pulse-width modulated.

The controller 68 also produces the synchronization signal on the line 46. As seen in FIG. 3, the synchronization signal comprises a series of positive pulses each coinciding with time periods during which the current flowing in one of the main generator portion armature windings 36a–36c is zero.

Referring again to FIG. 2, a three-phase pulse-width modulated inverter 74 receives DC power over a DC link 76. The DC link 76 may receive DC power from a three-phase rectifier 78 which is in turn coupled to an external AC source 79 or any other type of DC source.

Figure 4:
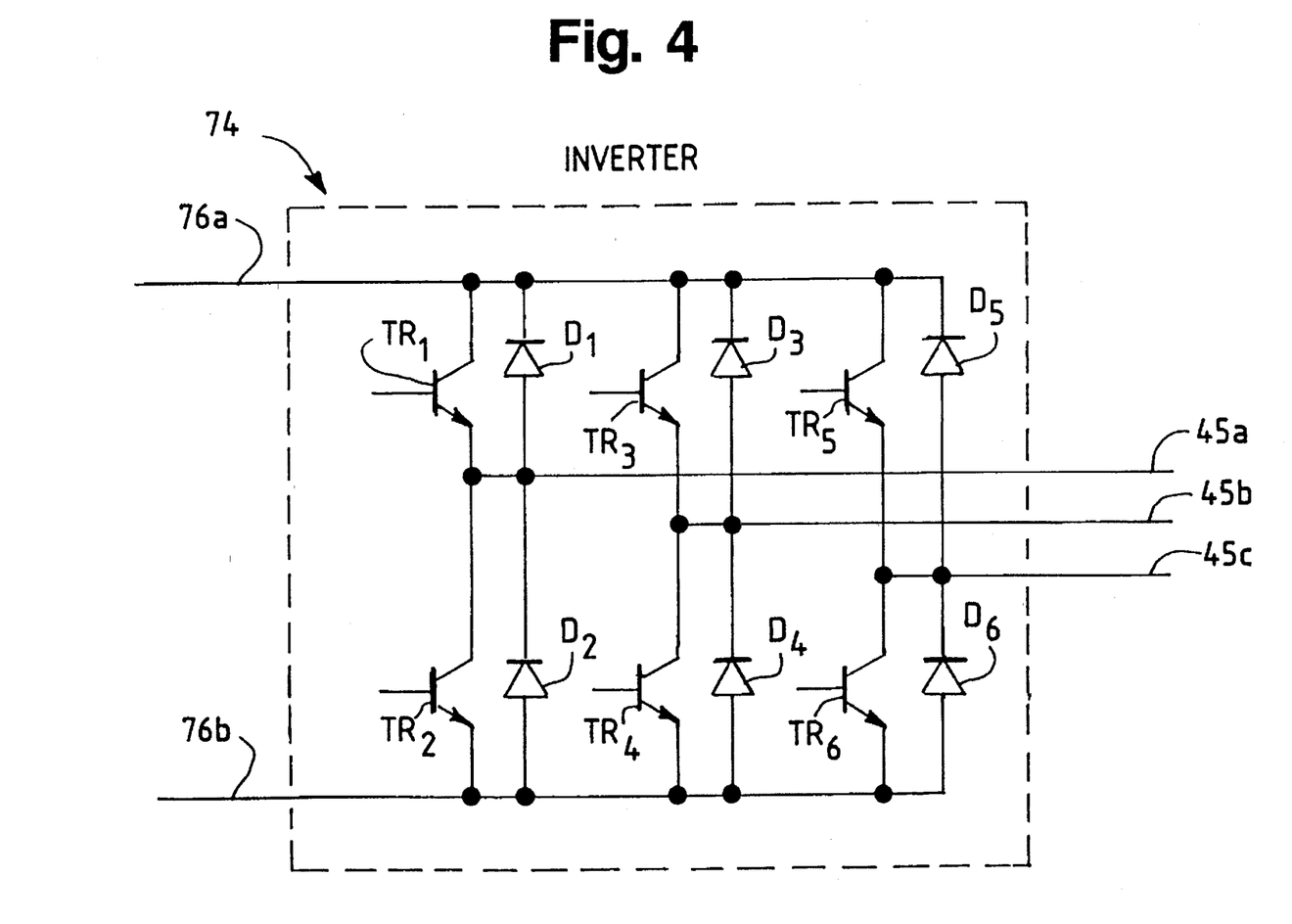
FIG. 4 comprises a schematic diagram of the three-phase pulse-width modulated inverter of FIG. 2.

Referring now to FIG. 4, the three-phase pulse-width modulated inverter 74 includes controllable power switches $TR_1$–$TR_6$ and associated flyback diodes D1–D6 connected in a three-phase bridge configuration across DC link conductors 76a, 76b. Referring again to FIG. 3, the control waveforms $T_1$, $T_3$ and $T_5$ include PWM notches in the positive-going portions thereof. These signals control the power switches $TR_1$, $TR_3$ and $TR_5$, respectively, of the inverter 74. The control waveforms $T_2$, $T_4$ and $T_6$ control the inverter power switches $TR_2$, $TR_4$ and $TR_6$, respectively. These signals may also include PWM notches. The widths of the PWM notches of the control waveforms $T_1$, $T_3$ and $T_5$ are controlled by a power control circuit 80. The power control circuit 80 includes a summer 82 which subtracts a signal representing the DC link current (which in turn represents the power delivered by the inverter 74 to the armature windings 36a–36c) from a power reference signal. The resulting power error signal is conditioned by a conditioner 84 which, preferably, comprises a proportional-integral type compensator but could, alternatively, comprise any type of gain and compensation unit. The output of the conditioner 84 is delivered to a controlled or adjustable limiter 86 which produces the power control 10 signal on the line 70.

The limiter 86 is controlled in accordance with a limiter control signal. The speed indication produced by the rotor position detector 44 is delivered to a multiplier 88 and multiplied by a constant volts-per-hertz signal to produce a speed dependent voltage signal. The speed dependent voltage signal is summed with a constant boost voltage by a summer 90, which in turn produces the limiter control signal. The constant boost voltage signal is proportional to the IR voltage drop in the main generator portion control windings and allows the power control signal to overcome these losses at initial start-up. Thereafter, as the speed indication developed by the rotor position detector 44 increases, the multiplier 88 produces a ramping signal which, when added to the boost voltage, increases the adjustable limit of the limiter 86 so that increasing power magnitudes can be delivered to the armature windings 36a–36c by the inverter 74.

Figure 5:
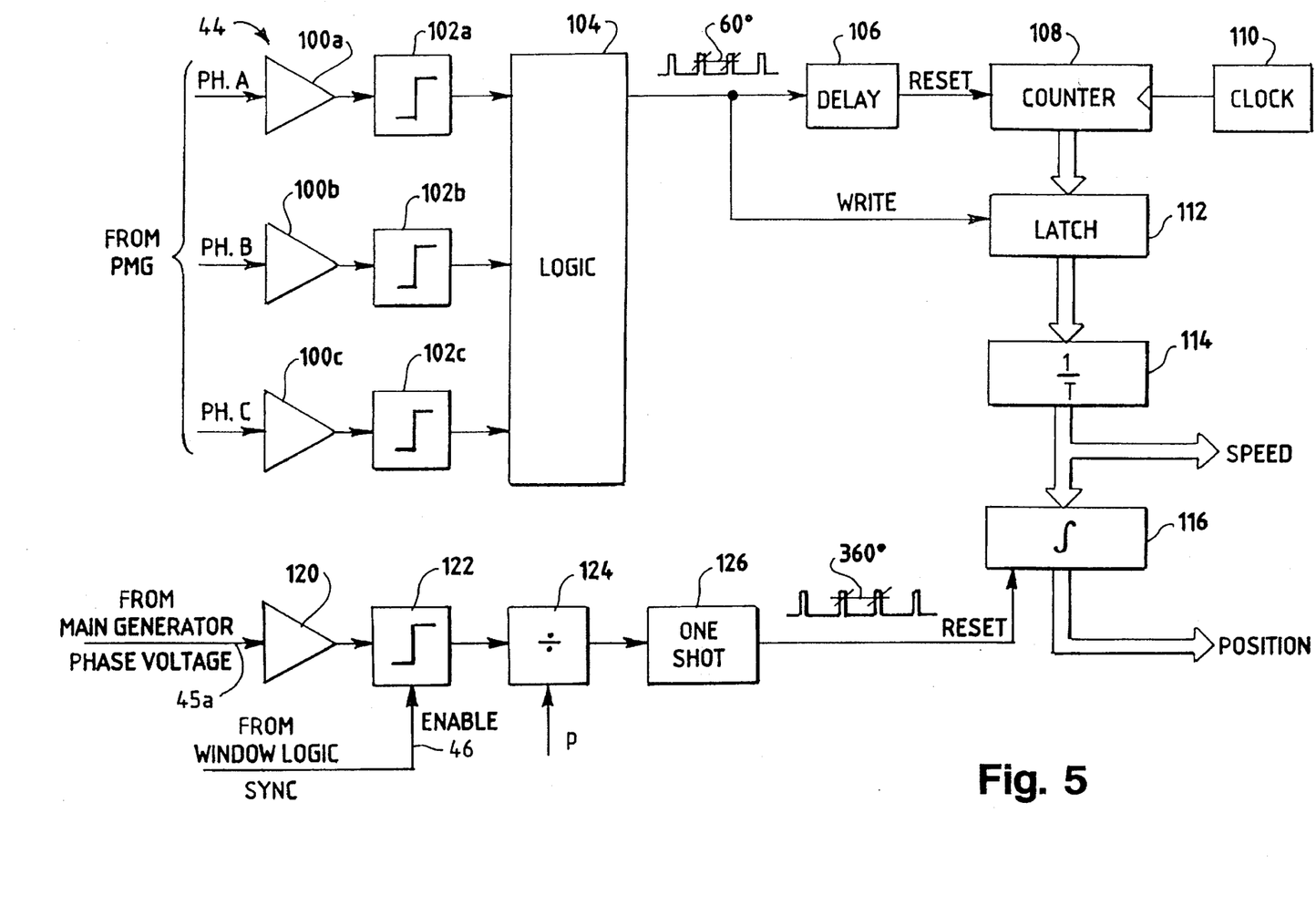
FIG. 5 comprises a block diagram of the rotor position detector of FIG. 2.
Figure 6:
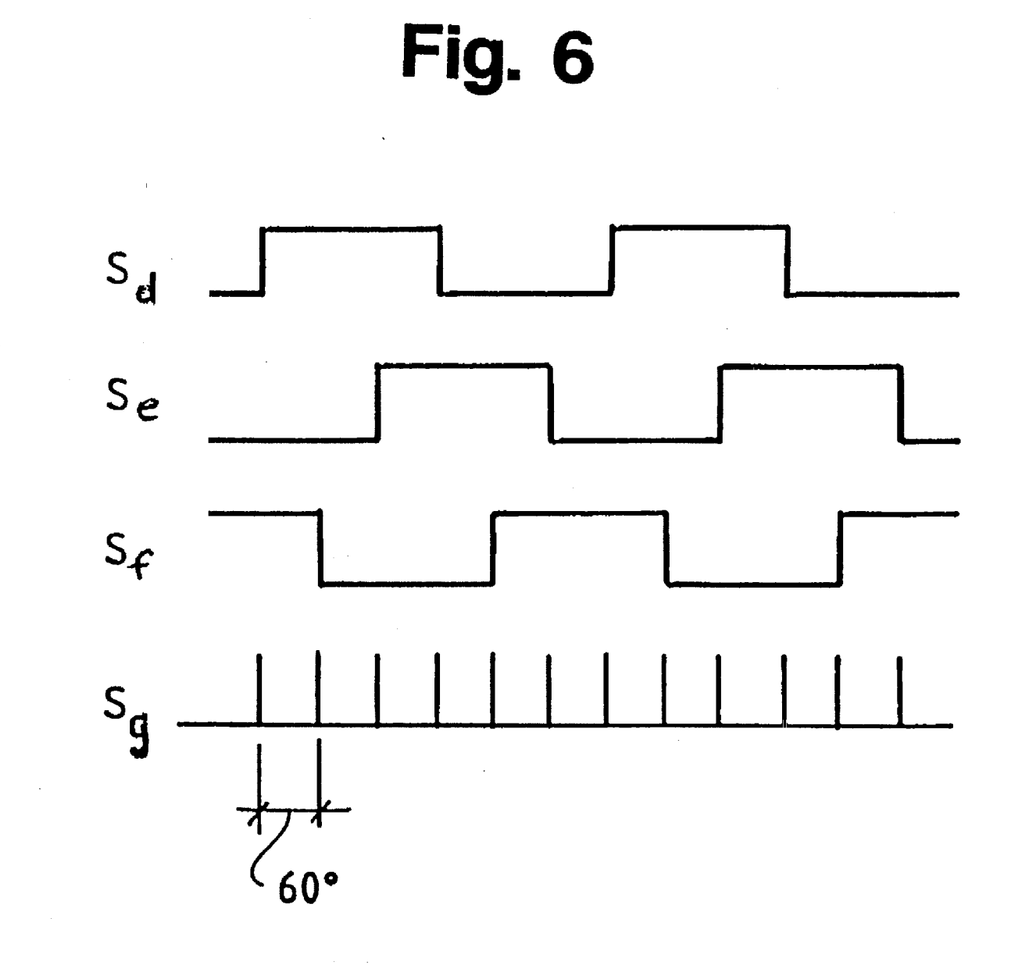
FIG. 6 illustrates the inputs to and the output from the logic circuit of FIG. 5.

Referring now to FIG. 5, the rotor position detector 44 is shown in greater detail. The PMG phase outputs are supplied through level shifting amplifiers 100a–100c and zero crossing detectors 102a–102c to a logic circuit 104. FIG. 6 illustrates three waveforms $S_d$, $S_e$, and $S_f$ representing the outputs of the zero crossing detectors 102a–102c, respectively. From the waveforms $S_d$–$S_f$, the logic circuit 104 develops a signal $S_g$ which, as shown in FIG. 6, consists of a narrow pulse every 60 electrical degrees. The waveform $S_g$ is provided by the logic circuit 104 to a delay circuit 106. The delay circuit 106 provides a reset signal to a counter 108 which accumulates clock pulses produced by a clock 110. The counter 108 is reset every 60° with respect to the output waveforms of the PMG 12, and thus every 60° of rotation of the motive power shaft 18. The output of the counter 108 represents the time that elapses between each pulse in the waveform $S_g$. The falling edge of each pulse comprises a write command to a latch 112 which latches the output of the counter 108. The output of the latch 112 is inverted, i.e., the reciprocal thereof is calculated, by a circuit 114 to obtain an indication of the speed of the motive power shaft 18. The output of the circuit 114 is supplied to an integrator 116 which integrates the speed signal to generate a signal representative of the position of the motive power shaft 118.

The integrator 116 is reset once per full revolution of the motive power shaft 18 by an input conditioner 120, preferably comprising a gain amplifier, a zero crossing detector 122, a frequency divider 124 and a one-shot 26. The input conditioner 120 scales one of the phase voltages from one of the main generator portion armature windings 36a–36c, e.g., the voltage appearing on the line 45a of FIG. 2. The synchronization signal on the line 46 enables the zero crossing detector 122 for a short period of time surrounding each expected zero crossing of the phase voltage V shown in FIG. 3 to provide a degree of noise immunity. The frequency divider 124 divides the frequency of the waveform produced by the zero crossing detector 122 by an amount equal to the number of poles in the main generator rotor and produces a signal to drive the one-shot 126 to reset the integrator 116 once every rotation of the motive power shaft 18.

Alternatively, the reset signal provided to the integrator 116 could be generated without the need to supply the synchronization signal to the zero crossing detector 122 by incorporating a low pass filter between the input conditioner 120 and the zero crossing detector 122. The cutoff frequency of the low pass filter would be selected to reject the PWM frequency (the high-frequency notches shown in the waveforms $T_1$, $T_3$, $T_5$ of FIG. 3) and its harmonics. In this alternative, the divider circuit 124 would divide by the number of poles divided by two, or P/2.

Figure 7:
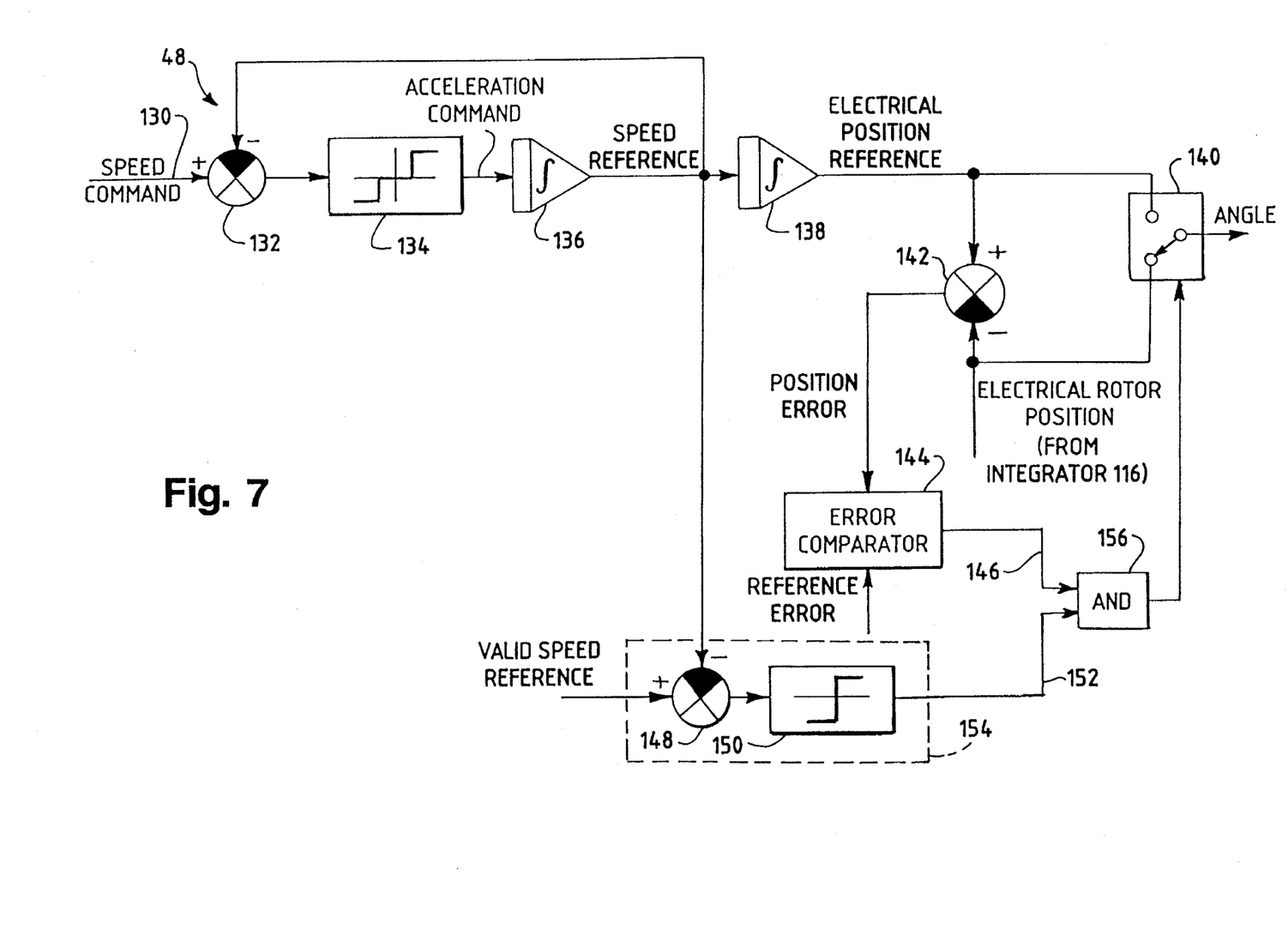
FIG. 7 comprises a block diagram of the speed controller of FIG. 2.
Figure 8:
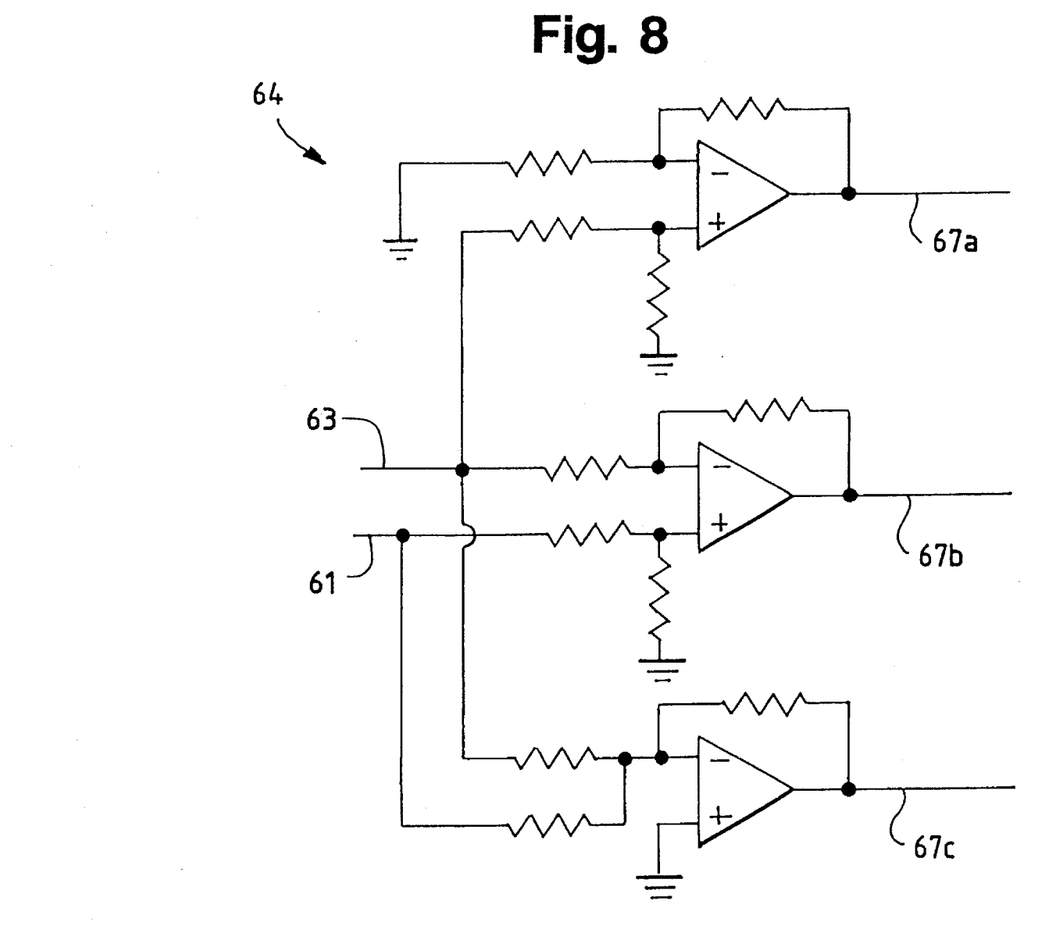
FIG. 8 comprises a circuit diagram of the phase converter of FIG. 2.

FIG. 7 illustrates the speed controller 48 in greater detail. A speed command signal may be developed on a line 130 which is coupled to a non-inverting input of a summer 132. The speed command may comprise a step voltage from a first voltage to a second, higher voltage or may comprise any other type of waveform as desired. The output of the summer 132 is coupled to a function generator 134 which develops an acceleration command signal which is, in turn, integrated by an integrator 136 to produce a speed reference signal. The speed reference signal is fed back to an inverting input of the summer 132, and hence the elements 132, 134, and 136 comprise a closed-loop circuit. The speed reference signal is integrated by a further integrator 138 to develop a position reference signal which is, in turn, provided to a controllable switch 140 and to a non-inverting input of a summer 142. The angular position indication comprising the position signal from the integrator 116 of FIG. 5 is also provided to the controllable switch 140 and is further provided to an inverting input of the summer 142. The summer 142 produces a position error signal indicative of the error between the derived position reference signal and the actual rotor position as developed by the integrator 116. The position error signal is provided to an error comparator 144 which compares the position error signal to an error reference and produces a high state signal on a line 146 when the position error signal is less than the error reference.

Furthermore, the speed reference signal produced by the integrator 136 is delivered to an inverting input of a summer 148 while a valid speed reference signal, indicative of the value at which the speed reference signal becomes a reliable representation of the speed of the motive power shaft, is delivered to a non-inverting input of the summer 148. The summer 148 produces a signal indicative of the difference between the speed reference signal and the valid speed reference signal. A zero crossing detector 150 detects when the speed reference signal equals or exceeds the valid speed reference signal and produces a high state output signal on a line 152 at such time. The summer 148 in conjunction with the zero crossing detector 150 thus comprise a speed comparator 154. The signals on the lines 146 and 152 are delivered to an AND gate 156 having an output which is coupled to and controls the controllable switch 140.

At the initiation of a start-up sequence, at which time the speed of the motive power shaft 18 is zero, the controllable switch 140 is set to a position which passes the output of the integrator 138 to the output of the switch 140, and thus to the multiplier 52 of FIG. 2. Also at this time, power is applied to the exciter portion 14, and hence to the main generation portion field winding 34 of FIG. 1A, and power is also applied to the main generator armature windings 36a–36c. The motive power shaft 18 is thus accelerated. When the error between the rotor position, as developed by the integrator 116 of FIG. 5, and the position reference signal, as derived by the integrator 138, is less than the error reference and when the speed reference signal produced by the integrator 136 is equal to or greater than the valid speed reference, the high-state signals on the lines 146 and 152 cause the AND gate 156 to move the controllable switch 140 to the position shown in FIG. 7. The controllable switch 140 is latched in such position so that the output of the integrator 116 of FIG. 5 is thereafter provided to the multiplier 52 of FIG. 2. The switch 140 remains latched until a new start-up sequence is initialized.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the Scope of the appended claims is reserved.

We claim:

1. A detector for detecting rotor position of a brushless generator having a motive power shaft, a permanent magnet generator (PMG) coupled to the shaft, the PMG having a set of armature phase windings at which a set of PMG phase outputs are produced, and a main generator portion coupled to the shaft, the main generator portion having a set of armature phase windings capable of receiving AC power, comprising:

means coupled to the PMG armature phase windings for deriving a number of internal pulses per revolution of the motive power shaft from the PMG phase outputs;

means coupled to the deriving means for measuring time periods between adjacent interval pulses; and means coupled to the measuring means for converting the measured time periods into an indication of the angular position of the motive power shaft.

2. A detector for detecting rotor position of a brushless generator having a motive power shaft, a permanent magnet generator (PMG) coupled to the shaft, the PMG having a set of armature phase windings at which a set of PMG phase outputs are produced, and a main generator portion coupled to the shaft, the main generator portion having a set of armature phase windings capable of receiving AC power, comprising:

means coupled to the PMG armature phase windings for deriving a number of internal pulses per revolution of the motive power shaft from the PMG phase outputs;

means coupled to the deriving means for measuring time periods between adjacent interval pulses;

means coupled to the measuring means for converting the measured time periods into an indication of the angular position of the motive power shaft; and wherein the measuring means comprises a counter which accumulates clock pulses during time periods between adjacent interval pulses.

3. The detector of claim 2, wherein the counter is periodically reset a certain number of times during each revolution of the motive power shaft by the interval pulses.

4. The detector of claim 2, wherein the converting means includes means for inverting a counter output signal developed by the counter to obtain an indication of the speed of the motive power shaft.

5. The detector of claim 4, wherein the converting means further includes an integrator coupled to the inverting means which develops the angular position indication.

6. The deflector of claim 5, wherein the accumulator is reset once per revolution of the motive power shaft by a reset signal derived from a parameter of AC power delivered to one of the main generator portion armature phase windings.

7. A starting system control for operating a brushless generator in a starting mode to convert electrical power into motive power wherein the brushless generator includes a motive power shaft, a permanent magnet generator (PMG) having a set of armature phase windings at which a set of PMG phase outputs are produced and a main generator portion having a set of armature phase windings which receive AC power during operation in the starting mode, comprising:

means coupled to the PMG armature phase windings for deriving a number of interval pulses per revolution of the motive power shaft from the PMG phase outputs;

means coupled to the deriving means for measuring time periods between adjacent interval pulses;

means coupled to the measuring means for converting the measured time periods into indications of the speed and angular position of the motive power shaft; and means coupled to the converting means for delivering AC power to the set of main generator portion armature phase windings in dependence upon the speed and angular position indications.

8. The starting system control of claim 7, wherein the delivering means comprises first means for developing an electrical angle command signal from the angular position indication, second means for developing a power control signal from the speed indication and an inverter responsive to the electrical angle command signal and the power control signal for delivering the AC power to the set of main generator portion armature phase windings.

9. The starting system control of claim 8, further including second means for converting the electrical angle command signal into a sine signal and a cosine signal and third means for converting the sine and cosine signals into three-phase signals.

10. The starting system control of claim 9, further including three zero crossing detectors each responsive to one of the three-phase signals for producing first, second and third inverter control signals, respectively, and an inverter controller responsive to the power control signal and coupled between the zero crossing detectors and the inverter which operates the inverter in accordance with the first, second and third inverter control signals and the power control signal.

11. The starting system control of claim 10, wherein the converting means is responsive to a parameter of the AC power applied to one of the main generator portion armature phase windings.

12. The starting system control of claim 11, wherein the inverter controller includes means for producing a synchronization signal from the AC power delivered to the main generator portion armature phase windings and wherein the converting means is further responsive to the synchronization signal for converting the measured time periods into the indication of the angular position of the motive power shaft.

13. The starting system control of claim 8, wherein the main generator portion includes a number of poles and the angular position indication comprises a position signal and wherein the first developing means includes a multiplier which multiplies the position signal with a signal proportional to the number of poles to obtain a multiplied signal and a summer for summing the multiplied signal with a phase advance command to obtain the electrical angle command signal.

14. The starting system control of claim 8, wherein the second developing means includes a first summer for summing a power reference with a signal indicative of the power produced by the inverter to produce a power error signal, means for conditioning the power error signal and means for limiting the conditioned power error signal to produce the power control signal.

15. The starting system control of claim 14, wherein the second developing means further includes a multiplier for multiplying the speed indication by a reference signal to produce a ramp signal and a second summer for summing the ramp signal and a boost signal to produce a signal for controlling the limiting means.

16. The starting system control of claim 8, wherein the motive power shaft is accelerated from zero speed to a particular speed over a series of revolutions, the main generator portion includes a number of poles and the angular position indication comprises a position signal and wherein the first developing means includes a position reference signal generator which develops a position reference signal, a switch which provides the position reference signal to an output thereof during an initial portion of the series of revolutions and which provides the position signal to the output after the initial portion of the series of revolutions, a multiplier coupled to the switch which multiplies the signal at the output of the switch with a signal proportional to the number of poles to obtain a multiplied signal and a summer for summing the multiplied signal with a phase advance command to obtain the electrical angle command signal.

17. The starting system control of claim 16, wherein the first developing means further includes means for detecting when a speed reference signal is equal to or greater than a valid speed reference, third means responsive to the position reference signal and the position signal for developing a position error signal, an error comparator for comparing an error reference to the position error signal, and means responsive to an output of the detecting means and to an output of the error comparator for controlling the operation of the switch.

18. The starting system control of claim 17, wherein the controlling means comprises an AND gate.

19. The starting system control of claim 7, wherein the measuring means comprises a counter which accumulates clock pulses during time periods between adjacent interval pulses.

20. The starting system control of claim 19, wherein the converting means includes means for inverting a counter output signal developed by the counter to obtain the speed indication.

21. The starting system control of claim 20, wherein the converting means further includes an accumulator coupled to the inverting means which develops the angular position indication.

22. The starting system control of claim 21, wherein the accumulator is periodically reset once per revolution of the motive power shaft by a reset signal derived from a parameter of the AC power applied to one of the main generator portion armature phase windings.

23. The starting system control of claim 22, further including a conditioner which receives a voltage developed at one of the main generator portion armature phase windings, a zero crossing detector coupled to an output of the conditioner, a frequency divider for dividing the frequency of an output of the zero crossing detector by an amount proportional to the number of poles of the main generator and a one-shot responsive to an output of the frequency divider for producing the reset signal.

24. A method of detecting rotor position of a brushless generator having a motive power shaft, a permanent magnet generator (PMG) having a set of armature phase windings at which a set of PMG phase outputs are produced and a main generator portion having a set of armature phase windings capable of receiving AC power and coupled to an exciter portion, the method comprising the steps of:

deriving a number of interval pulses per revolution of the motive power shaft from the PMG phase outputs;

measuring time periods between adjacent interval pulses;

deriving a reset signal from a parameter of AC power on one of the main generator portion armature phase windings; and converting the measured time periods into an indication of the angular position of the motive power shaft in accordance with the reset signal.

25. The method of claim 24, in combination with the further step of delivering AC power to the set of main generator portion armature phase windings in dependence upon the angular position indication.

26. The method of claim 24, wherein the step of measuring comprises the step of accumulating clock pulses in a counter during time periods between adjacent interval pulses.

27. The method of claim 26, wherein the step of measuring includes the step of using the interval pulses to periodically reset the counter a certain number of times during each revolution of the motive power shaft.

28. The method of claim 26, wherein the step of converting includes the step of inverting a counter output signal developed by the counter to obtain an indication of the speed of the motive power shaft.

29. The method of claim 28, wherein the step of converting further includes the step of providing an integrator for integrating the inverted counter output signal to develop the angular position indication.

30. The method of claim 29, wherein the step of converting includes the further step of using the reset signal to reset the integrator once per revolution of the motive power shaft.

31. The method of claim 30, in combination with the further step of delivering AC power to the set of main generator portion armature phase windings in dependence upon the angular position indication and the speed indication.

\* \* \* \* \*